United States Patent
Kesse et al.

(10) Patent No.: US 7,422,000 B2
(45) Date of Patent: Sep. 9, 2008

(54) METHOD OF TRANSITIONING BETWEEN OPERATING MODES IN AN INTERNAL COMBUSTION ENGINE

(75) Inventors: Mary L. Kesse, Peoria, IL (US); Kevin P. Duffy, Metamora, IL (US); Cory A. Brown, Pekin, IL (US); Roger L. Urven, Jr., Colona, IL (US)

(73) Assignee: Caterpillar Inc., Peoria, IL (US)

( * ) Notice: Subject to any disclaimer, the term of this patent is extended or adjusted under 35 U.S.C. 154(b) by 263 days.

(21) Appl. No.: 11/178,928

(22) Filed: Jul. 11, 2005

(65) Prior Publication Data

US 2007/0006842 A1 Jan. 11, 2007

(51) Int. Cl.
*F02B 3/00* (2006.01)
*F02B 3/02* (2006.01)

(52) U.S. Cl. ...................... 123/299; 123/305
(58) Field of Classification Search ................ 123/299, 123/300, 305, 295, 435; 239/533.2, 444, 239/533.12
See application file for complete search history.

(56) References Cited

U.S. PATENT DOCUMENTS

| | | | |
|---|---|---|---|
| 5,458,292 A | 10/1995 | Hapeman | |
| 5,740,777 A * | 4/1998 | Yamamoto et al. | 123/305 |
| 6,032,617 A * | 3/2000 | Willi et al. | 123/27 GE |
| 6,230,683 B1 | 5/2001 | Zur Loye et al. | |
| 6,516,774 B2 | 2/2003 | Zur Loye et al. | |
| 6,561,157 B2 | 5/2003 | Zur Loye et al. | |
| 6,595,181 B2 * | 7/2003 | Najt et al. | 123/295 |
| 6,659,071 B2 | 12/2003 | LaPointe et al. | |
| 6,668,789 B1 | 12/2003 | Marriott et al. | |
| 6,668,790 B2 * | 12/2003 | Chmela et al. | 123/295 |
| 6,684,852 B2 | 2/2004 | Wright et al. | |
| 6,769,635 B2 | 8/2004 | Stewart et al. | |
| 7,021,276 B2 * | 4/2006 | Liu et al. | 123/299 |
| 2002/0020388 A1 | 2/2002 | Wright et al. | |
| 2002/0121263 A1 * | 9/2002 | Chmela et al. | 123/295 |
| 2003/0066509 A1 | 4/2003 | Shafer et al. | |
| 2004/0055559 A1 | 3/2004 | Best | |
| 2004/0194759 A1 * | 10/2004 | Yamaoka et al. | 123/435 |
| 2004/0267430 A1 | 12/2004 | Ancimer | |
| 2006/0185353 A1 * | 8/2006 | Liu et al. | 60/297 |
| 2006/0288978 A1 * | 12/2006 | Kesse | 123/295 |

* cited by examiner

*Primary Examiner*—Mahmoud Gimie
(74) *Attorney, Agent, or Firm*—Liell & McNeil

(57) ABSTRACT

A method of operating an internal combustion engine is provided. The method includes injecting a first fuel charge into at least one cylinder of the engine. The method further includes determining a value indicative of at least one of a cylinder pressure and a rate of change in cylinder pressure. The method further includes injecting a second fuel charge into the at least one cylinder, upon the occurrence of a predetermined contingency, which may be a determined cylinder pressure or rate in change thereof exceeding a predetermined threshold. An internal combustion engine is further provided, including an electronic controller having a control algorithm. The control algorithm includes software for determining a value indicative of at least one of a cylinder pressure and a rate of change in cylinder pressure of at least one cylinder of the engine. The control algorithm further includes logic for transitioning a fuel injector of the engine between modes, based upon the occurrence of a predetermined contingency, which may be the determined value.

21 Claims, 3 Drawing Sheets

METHOD OF TRANSITIONING BETWEEN OPERATING MODES IN AN INTERNAL COMBUSTION ENGINE

TECHNICAL FIELD

The present disclosure relates generally to internal combustion engines and operating methods therefor, and relates more particularly to a method of transitioning between operating modes in such an engine, upon the occurrence of a predetermined contingency.

BACKGROUND

The sophistication of internal combustion engines and engine operating schemes continues to increase, and innovations in design and operation are revealed almost daily. One driving force behind many of the design changes in recent years has been increasingly stringent emissions requirements. One general approach to improving emissions quality relates to treatment of combustion products downstream from the engine. In other words, exhaust gases produced by the engine are treated via a variety of chemical and/or physical processes in an attempt to remove or reduce undesired constituents. Other engine developers have focused more on the combustion process itself. Manipulation of fuel injection quantity, frequency, timing and even the type of spray pattern has been shown to have various effects on engine emissions. Of particular interest to engineers are the increasingly stringent government requirements relating to emission limits on various nitrogen-oxygen compounds, known collectively as "NOx".

It has been discovered that enhancing mixing of air and fuel prior to ignition in an internal combustion engine cylinder can help reduce NOx levels in the engine exhaust. One approach in particular is known in the art as "homogeneous charge" ignition. In compression ignition engines, this approach is widely referred to as "HCCI". In a homogeneous charge mode, fuel may be injected into a compression ignition engine cylinder prior to the point during an engine cycle at which cylinder conditions will trigger autoignition. This differs from a more traditional approach, wherein fuel is primarily injected during an engine cycle close to a point at which autoignition can occur. In other words, rather than fuel more or less continuously combusting as it leaves the fuel injector tip, in homogeneous charge mode the fuel may be injected in advance of autoignition conditions, such that the fuel and air have relatively more time to mix as the piston travels upward in the cylinder.

Homogeneous charge operation tends to be relatively sensitive to various operating conditions external to and internal of the engine. Ambient temperature and pressure, as well as the timing of autoignition conditions in the engine cycle, for example, can affect the ability of an engine to successfully operate in a homogeneous charge mode. Another factor bearing on the success of operation relates to limitations of homogeneous charge engines to only a portion of their theoretical load range. Increases in power demand on an engine are typically accommodated by increasing the quantity of fuel combusted in a given engine cycle. Where an engine is operated in homogenous charge mode, injected fuel tends to ignite more uniformly, in many cases generating relatively greater cylinder pressure and cylinder pressure spikes than conventional ignition of an equivalent fuel quantity. As the power demands and thus injected fuel quantity increase, the engine may reach a point at which physical stresses on the engine hardware may be too great to accommodate a larger homogenous charge combustion event.

U.S. Pat. No. 6,725,838 to Shafer et al. sets forth one fuel injector having dual mode capabilities, for operation in a homogeneous charge mode, a conventional mode or a mixed mode. While Shafer discusses various designs and operating strategies, there is always room for improvement.

The present disclosure is directed to one or more of the problems or shortcomings set forth above.

SUMMARY OF THE INVENTION

In one aspect, the present disclosure provides a method of operating an internal combustion engine including at least one cylinder with a mixed mode fuel injector disposed at least partially therein. The method includes the step of injecting a first fuel charge into the at least one cylinder via a first spray pattern of the mixed mode fuel injector. The method further includes the step of determining a value indicative of at least one of a cylinder pressure and a rate of change in cylinder pressure of the at least one cylinder. The method still further includes the step of injecting a second fuel charge into the at least one cylinder via a second spray pattern of the mixed mode fuel injector different from the first spray pattern, upon the occurrence of a predetermined contingency.

In another aspect, the present disclosure provides an internal combustion engine. The internal combustion engine includes an engine housing having at least one cylinder, and a mixed mode fuel injector disposed at least partially within the at least one cylinder. The engine further includes means for determining a value indicative of at least one of a cylinder pressure and a rate of change in cylinder pressure of the at least one cylinder. The engine still further includes an electronic controller in control communication with the fuel injector and with the means for determining. The electronic controller includes a computer readable medium having a control algorithm recorded thereon including means for transitioning between first and second injection modes of the fuel injector, based upon the occurrence of a predetermined contingency.

In still another aspect, the present disclosure provides an article having a computer readable medium with a control algorithm recorded thereon. The control algorithm includes, means for determining a value indicative of at least one of a cylinder pressure and a rate of change in cylinder pressure in an internal combustion engine having at least one cylinder, and means for transitioning at least one mixed mode fuel injector of the internal combustion engine between a first fuel injection mode and a second fuel injection mode, based upon the occurrence of a predetermined contingency.

In still another aspect, the present disclosure provides a method of operating an internal combustion engine including at least one cylinder with a mixed mode fuel injector disposed at least partially therein. The method includes the step of injecting a first fuel charge into the at least one cylinder via a first spray pattern of the mixed mode fuel injector. The method still further includes the step of injecting a second fuel charge into the at least one cylinder via a second spray pattern of the mixed mode fuel injector different from the first spray pattern, upon the occurrence of a predetermined contingency other than engine load.

DETAILED DESCRIPTION

Figure 1:
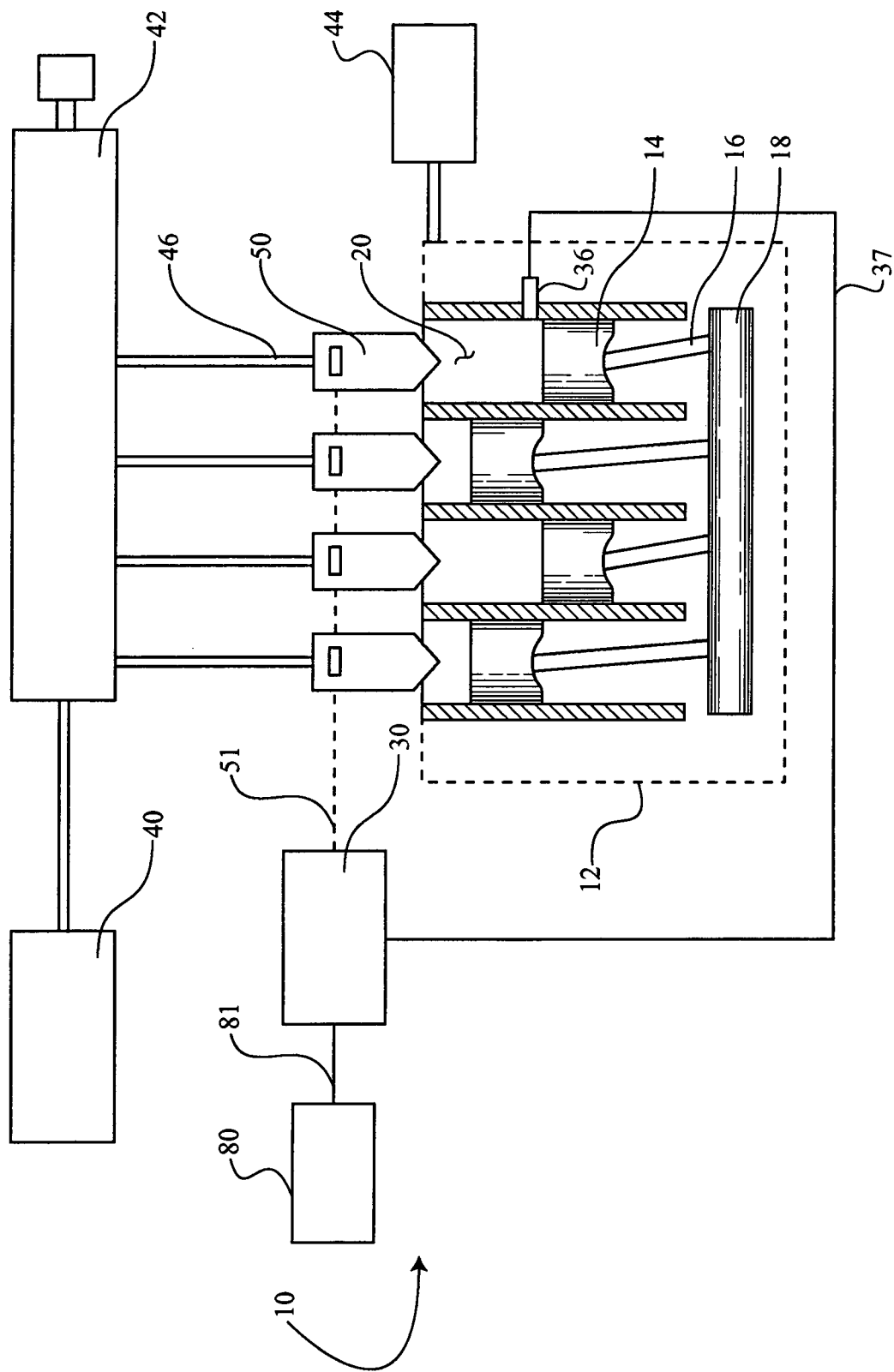
FIG. 1 is a diagrammatic side view of an internal combustion engine according to the present disclosure.

Referring to FIG. 1, there is shown an engine 10 according to the present disclosure. Engine 10 includes an engine housing 12 having at least one cylinder 20, for example, a plurality of cylinders disposed therein. Engine 10 may further include a piston 14 positioned at least partially within cylinder 20 and reciprocable therein in a conventional manner. A piston rod 16 connects piston 14 with a crankshaft 18 in a conventional manner. A source of pressurized fuel or a pump 40 may be provided and fluidly connected to a plurality of fuel injectors 50 via a common rail 42 and supply passages 46. Engine 10 will typically include plural cylinders, each with a corresponding fuel injector, however, for clarity the present description refers primarily to cylinder 20 and fuel injector 50 in the singular. Engine housing 12 may further be coupled with an exhaust system 44, and a turbocharger (not shown). While it is contemplated that in one embodiment, engine 10 will be a common rail engine, alternative embodiments are contemplated, for example an engine having one or more unit pumps coupled with the respective fuel injectors. It is further contemplated that engine 10 may be a compression ignition engine, however, it should be appreciated that other engine designs, such as a spark ignited engine, as well as other fuel types such as gasoline might be employed in alternative embodiments.

Engine 10 may further include an electronic controller 30 operable to control and/or monitor certain aspects of operation of engine 10. Electronic controller 30 may be in communication with a pressure sensor 36 exposed to a fluid pressure of cylinder 20. For example, pressure sensor 36 may be disposed at least partially within cylinder 20 and coupled with electronic controller 30 via a communication line 37. Embodiments are contemplated wherein only one cylinder includes a pressure sensor associated therewith, as well as embodiments where more than one or all of the engine cylinders are coupled with a pressure sensor. Pressure sensor 36 may be any of a variety of pressure sensors known in the art, for example, a piezo-resistive sensor having a diaphragm that is deflected by fluid pressure from cylinder 20.

Figure 2:
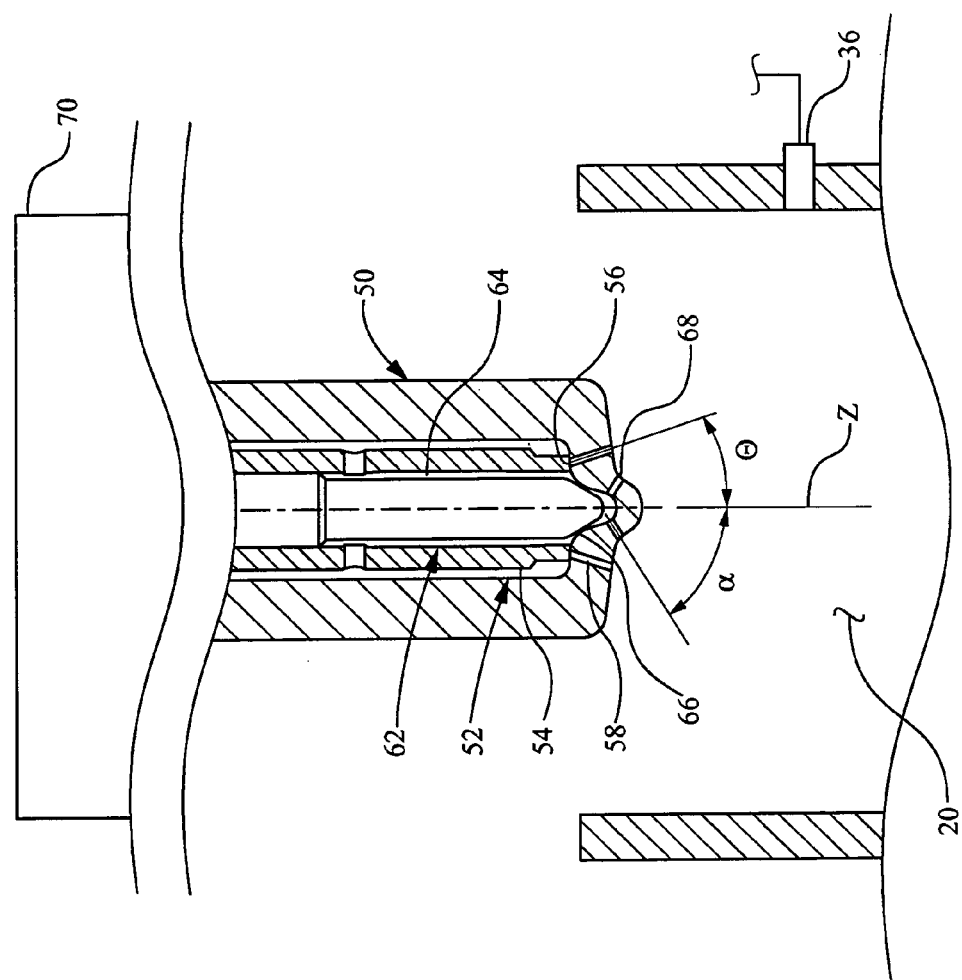
FIG. 2 is a partially sectioned side view of a portion of the internal combustion engine of FIG. 1.

Referring also to FIG. 2, electronic controller 30 may also be in control communication with each fuel injector 50 via another communication line 51. Each fuel injector 50 may be a mixed mode fuel injector disposed at least partially within cylinder 20. A variety of suitable mixed mode fuel injectors are known in the art. One exemplary mixed mode fuel injector is known from U.S. Pat. No. 6,725,838 to Shafer et al. Another suitable mixed mode fuel injector is injector 50, a portion of which is shown in FIG. 2.

Injector 50 may be a dual concentric check fuel injector, including a first or outer check 52 and a second or inner check 62. Outer check 52 may include a first valve member 54 operable to open or close a first set of injection orifices 58 by moving away from or against a first seat 56, respectively. Inner check 62 in turn may include a second valve member 64 operable to open or close a second set of injection orifices 68 different from first set 58 by moving away from or against a second seat 66, respectively. A control valve assembly 70 may be coupled with fuel injector 50 and with electronic controller 30 to control the opening and closing of outer check 52 and inner check 62. In one contemplated embodiment, electronic controller 30 will be operable to selectively open one or both of first check 52 and second check 62 to inject fuel through the desired corresponding set(s) of injection orifices. Electronic controller 30 may further be operable to command the respective injection(s) at a selected time during a given engine cycle, as described herein.

First set of injection orifices 58 may include a plurality of injection orifices disposed at a first average spray angle $\alpha$ relative to an axis Z of cylinder 20. Second set of injection orifices 68 may include a plurality of injection orifices different from first set 58 that are disposed at a second average spray angle $\theta$ relative to axis Z that is larger than first average spray angle $\alpha$. Injection orifices 58 define a first spray pattern of fuel injector 50, whereas injection orifices 68 define a second, different spray pattern of fuel injector 50. It is contemplated that fuel injection via first set of injection orifices 58 may be primarily for homogeneous charge mode operation, whereas fuel injection via second set 68 may be primarily for conventional operation. Simultaneous injection via both first set 58 and second set 68 may take place, for example where a relatively large fuel injection volume is desired per each injection. Both homogeneous charge mode and conventional mode operation may be selectively employed during the same engine cycle, in a "mixed mode" as described herein. Those skilled in the art will appreciate that alternative means for providing different spray patterns might be employed without departing from the scope of the present disclosure. For instance, rather than separate sets of injection orifices having different average spray angles, sets of orifices having different sizes or different numbers might be utilized to provide more than one available spray pattern of fuel injector 50.

The present disclosure further provides a method of operating an internal combustion engine 10 that includes at least one cylinder 20 with a mixed mode fuel injector 50 disposed at least partially therein. The method may include the step of injecting a first fuel charge into cylinder 20 via a first spray pattern of fuel injector 50. The spray pattern may be, for instance, the spray pattern defined by first set of injection orifices 58. Where engine 10 is operating in a homogeneous charge mode, the first fuel charge may be injected during a given engine cycle prior to a point at which autoignition conditions occur in the particular cylinder, for example prior to a point at which piston 14 reaches a top dead center position during a compression stroke of the given engine cycle. Further, injection of the first fuel charge may take place at least in part by moving first check 52 from seat 56, and may terminate at least in part by moving first check 52 against seat 56.

The method may further include the step of determining a value indicative of at least one of a cylinder pressure and a rate of change in cylinder pressure in cylinder 20. As used herein, the term "value indicative of" should be understood to refer to values arising from both direct measurements of the quantity or characteristic of interest, as well as indirect measurements or estimates based on values, quantities, etc. having a known or ascertainable relationship with the characteristic of interest. In the present disclosure, the described determination may be made at least in part with cylinder pressure sensor 36 exposed to a fluid pressure of cylinder 20, or by another suitable means.

Cylinder pressure sensor 36 may include, for instance, a piezoelectric sensor exposed to cylinder 20. Piezoelectric sensors may include one or more piezoelectric diaphragms, generating a particular voltage or change in voltage upon experiencing a certain degree of deflection or rate of change in deflection due to cylinder pressures. Rather than measuring cylinder pressure directly, another means for determining the value indicative of at least one of, cylinder pressure and rate of change in cylinder pressure may include an optical sensor. Certain optical sensors may be employed to determine an amplitude of transmitted light within the cylinder, having a known relationship with cylinder pressure. Such sensors are commercially available from Optrand, Inc. of Plymouth, Mich. Other suitable optical sensors include an interferometer operable to measure changes in light frequency in a semi-permeable cavity that changes shape based on cylinder pressure. Such interferometer sensors are commercially available from Fiber Dynamics, Inc. of High Point, N.C. Yet another suitable sensor type may include a micro-strain gauge cylinder pressure sensor. Such sensors are operable to determine the relatively small movements of a glow plug rod in the cylinder in proportion to changes in cylinder pressure, and are commercially available from Texas Instruments of Dallas, Tex. Ion sensors manufactured by Woodward Governor of Rockford, Ill., which measure the levels of ions in the vicinity of an in-cylinder probe may also be used. Those skilled in the art will appreciate that still further suitable means for determining a value indicative of cylinder pressure and/or changes in cylinder pressure are available, or yet to be discovered, whose use in the present context will fall within the intended spirit and scope of the present disclosure.

The present method may further include the step of injecting a second fuel charge into the at least one cylinder via a second spray pattern of fuel injector 50, based upon the occurrence of a predetermined contingency. In some embodiments the predetermined contingency may be an engine load, or a parameter relating to engine load. The predetermined contingency may be, for example, a predetermined cylinder pressure threshold or predetermined rate of change in cylinder pressure threshold.

It is further contemplated that injection of the second fuel charge during a given engine cycle, and thus the transitioning from one mode of operation to a second mode of operation, may be based at least in part on a relatively higher operator commanded speed or load of engine 10. In certain operating environments, it may be desirable to maximize the use of homogeneous charge operation across a load range of engine 10. Where an operator has commanded a speed or load increase, engine 10 may generally be operated in homogenous charge mode up to a point at or close to which determined cylinder pressures and/or pressure spikes reach a limit that the engine hardware can tolerate, prior to bringing on conventional operation. In other words, upon commanding a speed or load increase, homogeneous charge operation may be used to accommodate the commanded increase up to a desired threshold (i.e. predetermined contingency), above which conventional operation may be used to supplement the engine power provided by homogeneous charge operation. At least one of cylinder pressure and rate of change in cylinder pressure may be employed to determine that it is desirable or necessary to initiate supplemental, conventional fuel injections. One means of determining when the appropriate conditions exist is via pressure sensor 36, as described herein. Commanded load above a predetermined threshold may also be a predetermined contingency according to the present disclosure.

Alternative predetermined contingencies for transitioning are contemplated, however, which are not related to, or necessarily related to, engine load. For example, a boost pressure of a turbocharger coupled with engine 10 or an exhaust temperature of engine 10 might serve as a predetermined contingency for initiating selective injections via the second spray pattern. In general, homogeneous charge operation tends to result in relatively cooler exhaust temperatures and pressures, as typically more of the available combustion energy of a given fuel charge is converted to mechanical energy of piston 14 during combustion than in conventional operation. Where desirable to increase the exhaust temperatures and/or pressures, mixed mode operation might be selectively initiated to provide additional exhaust energy, the transitioning between modes thus being based on a predetermined contingency other than an engine load.

The step of injecting the second fuel charge may further include injecting the second fuel charge via orifices 68, at least in part by moving second check 62 from seat 66. The second charge may be injected subsequent to injection of the first charge in a given engine cycle. Further, the second charge may be injected at or close to a point at which autoignition conditions are already present in cylinder 20. Where engine 10 is operating in a mixed mode as described herein, ignition of both of the first and second fuel charges will typically take place during the same engine cycle. The second fuel charge, may be injected when piston 14 is close to a top dead center position, when autoignition conditions exist, or it may be ignited via residual heat from ignition of the first charge, or by some other means, such as spark ignition.

The method may further include the step of determining at least one of, a commanded engine speed and a commanded engine load. In one contemplated embodiment, electronic controller 30 will be in communication via a communication line 81 with a set of operator controls 80 and may determine the speed and/or load the operator is requesting/commanding, for example by determining a commanded throttle position or determining an actual throttle position. Once an operator has commanded a speed or load that will require engine 10 to operate above an upper threshold for practicable homogeneous charge mode operation, electronic controller 30 may monitor cylinder pressure conditions, for example, until an appropriate transition point is reached. Electronic controller 30 may be programmed with a look-up table, for example, wherein cylinder pressure and/or rates of change in cylinder pressure are mapped to conventional fuel injection timing and quantity in a given engine cycle. Neural networks or other suitable means might also be employed such that electronic controller 30 may transition engine 10 between operating modes as desired. Embodiments are further contemplated wherein cylinder pressure and/or cylinder pressure increases are mapped to a throttle position of engine 10. Such an embodiment may not include a cylinder pressure sensor, for instance.

Electronic controller 30 may further include an article having a computer readable medium with a control algorithm recorded thereon. The computer readable medium may comprise RAM, ROM or any other suitable medium. The control algorithm may include means for determining a value indicative of at least one of, a cylinder pressure and a rate of change in cylinder pressure of cylinder 20. The control algorithm may further include means for transitioning fuel injector 50 between a first fuel injection mode and a second fuel injection mode, based upon the occurrence of a predetermined contingency.

As described herein, the first and second injection modes may correspond to fuel injection via the first and second spray patterns of fuel injector 50, and may take place at different times during a given engine cycle. The means for determining the value indicative of at least one of cylinder pressure and a rate of change in cylinder pressure may further include means for determining said value via a control signal between electronic controller 30 and pressure sensor 36. The means for transitioning may further include means for transitioning fuel injector 50 if at least one of a determined cylinder pressure and a rate of change in cylinder pressure exceeds a corresponding predetermined threshold. The predetermined thresholds may correspond to pressure levels and/or pressure spikes or rates or increase that risk damage to the engine hardware.

The control algorithm may further include means for determining a value indicative of a crank angle of engine 10, and means for commanding a first fuel injection within a crank angle range between about 180 degrees and about 360 degrees. In certain embodiments, this crank angle range will correspond to a range prior to which autoignition conditions may occur in cylinder 20, and it is contemplated that for homogeneous charge mode operation, the injection of the first fuel charge will take place prior to autoignition conditions. Further still, the control algorithm may include means for commanding a second injection subsequent to the first injection within a crank angle range between about 340 degrees and about 20 degrees, corresponding to a range of about 20 degrees of crank angle on either side of a top dead center position of piston 14. It is contemplated that injection of the second fuel charge will typically take place at or close to a time of autoignition conditions in cylinder 20.

The control algorithm may further include means for determining at least one of, a commanded engine speed and a commanded engine load. The means for transitioning may include means for transitioning fuel injector 50 between the first injection mode, for example a homogeneous charge mode, and the second injection mode, for example a conventional mode, based at least in part on the at least one of, commanded engine speed and commanded engine load.

The control algorithm of electronic controller 30 may be a closed loop control algorithm, incorporating a feedback term based on the determined value indicative of at least one of cylinder pressure and a rate of change in cylinder pressure. Where at least one of commanded engine speed and commanded engine load is above a predetermined level, electronic controller 30 may continuously monitor the at least one of cylinder pressure and rate of change in cylinder pressure to determine an appropriate transition point at which supplemental conventional injections will begin, to accommodate the power demands on engine 10. Also contemplated is an open loop strategy where commanded throttle position beyond a predetermined throttle position is the predetermined contingency.

INDUSTRIAL APPLICABILITY

In one contemplated embodiment, homogeneous charge operation of engine 10 will be employed so long as engine 10 is operating in a lower portion of its available power range. Thus, fuel injection operation of engine 10 may be effected at least primarily via the described first spray pattern of fuel injector 50. At an appropriate time, for example, where piston 14 is well away from a top dead center position, electronic controller 30 may command injection of fuel via first set of orifices 58 and opening of first check 52. The injected fuel, the first fuel charge as described herein, will mix with air in cylinder 20 as piston 14 travels upward toward a top dead center position. As described herein, the first fuel charge may be injected at the relatively narrow spray angle θ, such that the fuel spray is directed generally deeper or more downwardly into cylinder 20 so as not to impinge on the cylinder wall. Typically, autoignition conditions will arise in cylinder 20 at least in part due to the compression of air therein by piston 14 as it travels from bottom dead center toward top dead center. The first fuel charge may compression ignite when autoignition conditions are reached, in turn urging piston 14 back toward a bottom dead center position, in preparation for an expansion stroke, in a four cycle embodiment for example.

Where an operator commands an increased speed or load, electronic controller 30 may command injection of a greater quantity of fuel via the first spray pattern to speed up engine 10 or accommodate an increased load, for example, where an on-highway truck employing engine 10 encounters an incline. Because homogenous charge operation typically produces relatively lower levels of certain undesirable emissions, in many instances it will be desirable to operate engine 10 solely via homogeneous charge operation up to as high a load level as practicable. However, in certain operating environments, and with certain engine designs, the peak cylinder pressures and rates of cylinder pressure rise from increasing fuel injection amounts to accommodate increased loads in homogeneous charge mode operation can increase to undesirable or unmanageable levels.

In such instances, fuel injector 50 may be operated to provide supplemental fuel injections to accommodate the increased power demands via its second spray pattern. Conventional operation may give rise to relatively lower pressures and rates of pressure rise than homogeneous charge mode operation, for a given fuel injection quantity. By selectively adding the second, conventional injection increased power demands can be accommodated without risking damage to engine hardware. Thus, in one contemplated embodiment, the first fuel charge may be injected relatively early in a given engine cycle, providing as much power to engine 10 as practicable without exceeding the hardware or other limitations thereof. The second fuel charge, if used, may make up the balance of the power demand on engine 10. When it is desirable to inject the second fuel charge, electronic controller 30 may command opening of second check 62 to allow fuel to be injected via second set of orifices 68, typically when autoignition conditions have already developed in cylinder 20. The relative volumes of fuel injected in each charge may be varied or reallocated as desired or as needed. Where the power demands on engine 10 return to a range that can be practicably accommodated solely via homogeneous charge operation, operation may return to injection only via the first spray pattern.

It is contemplated that the particular timing of the transition from the first mode, employing only homogeneous charge operation, to the second mode, employing both homogeneous charge and conventional operation, may be determined by the closed loop control algorithm of the present disclosure. Once engine 10 is commanded to enter or approach a relatively higher load range, peak pressure and pressure rise in cylinder 20 may be measured to determine the point at which supplemental injections via the second spray pattern should begin. In this fashion, homogeneous charge mode alone may be used as long as practicable, reducing certain undesirable emissions, and when cylinder pressures and/or rates of change thereof reach corresponding predetermined thresholds, injection via the second spray pattern will begin.

Figure 3:
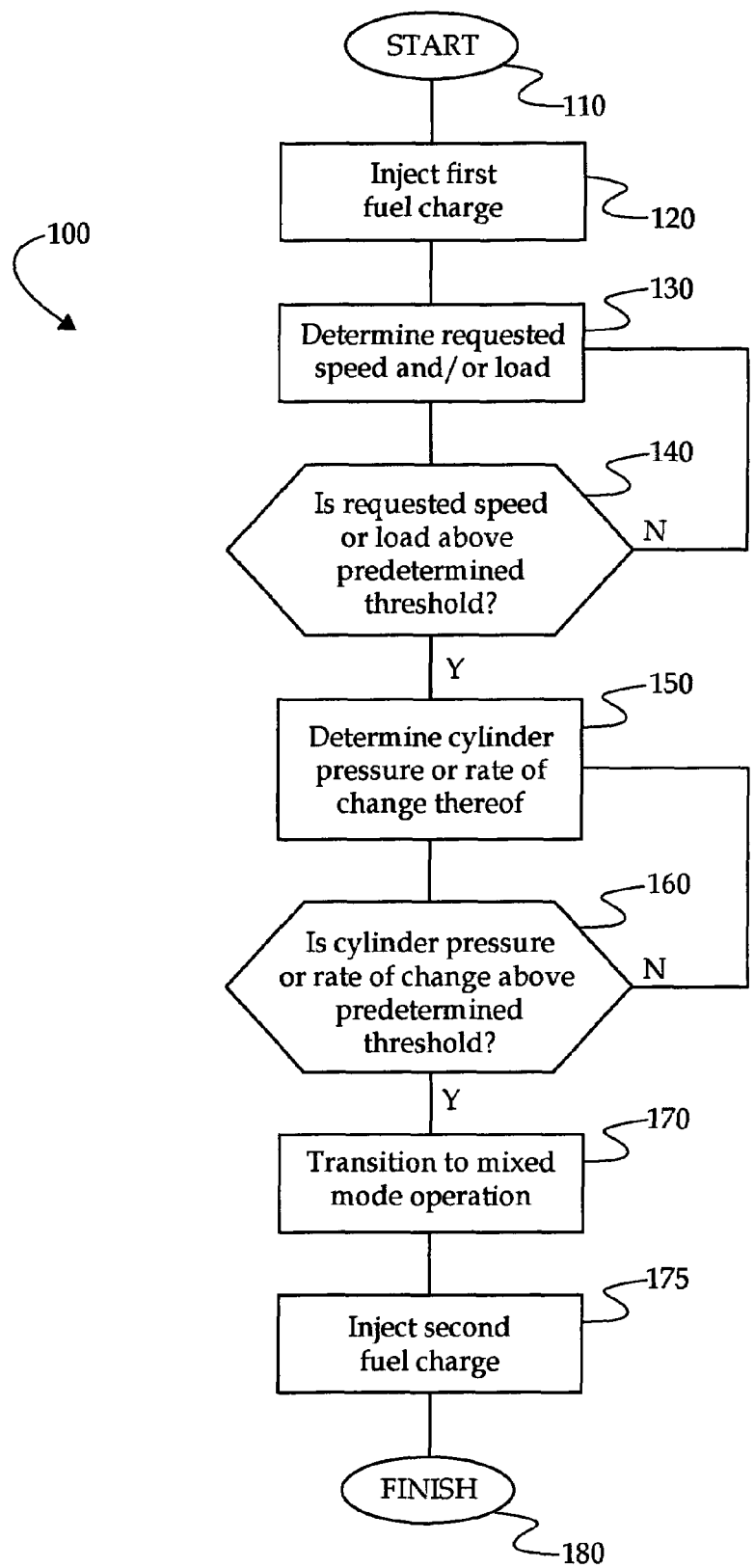
FIG. 3 is a flowchart illustrating a control process according to the present disclosure.

Turning now to FIG. 3, there is shown a flowchart 100 illustrating an exemplary control process according to the present disclosure. The process of flowchart 100 begins at Box 110, START. From Box 110, a first fuel charge may be injected at Box 120. Following injection of the first fuel charge, the process may proceed to Box 130 wherein electronic controller 30 may determine an operator requested speed and/or load. From Box 130, the process may proceed to Box 140 wherein electronic controller 30 may query whether requested speed and/or load is above a predetermined threshold. If no, the process may return to Box 130. If yes, the process may proceed to Box 150 wherein electronic controller 30 may determine the described value indicative of cylinder pressure 30 and/or rate of change in cylinder pressure.

From Box 150, the process may proceed to Box 160 wherein electronic controller 30 may query whether cylinder pressure is above a predetermined threshold at some time during an engine cycle. If no, the process may return to Box 150. If yes, then the process may proceed to Box 170 wherein electronic controller 30 may determine that a transition to mixed mode operation is appropriate. From Box 170, the process may proceed to Box 175 wherein electronic controller 30 may command injection of the second fuel charge. The process may terminate at Box 180, FINISH.

Operating an internal combustion engine according to the present disclosure may thus allow maximizing of the proportion of an engine's power derived from HCCI operation. Upper thresholds for HCCI are typically reached when pressure sensor 36 indicates that a maximum pressure or a maximum rate of pressure rise has occurred or is occurring. Upon determining with electronic controller 30 that the upper realm of HCCI power has been reached, electronic controller 30 will begin to supplement the power output of engine 10 with conventional combustion events, as described herein.

The present description is for illustrative purposes only, and should not be construed to narrow the breadth of the present disclosure in any way. Thus, those skilled in the art will appreciate that various modifications might be made to the presently disclosed embodiments, without departing from the intended spirit and scope of the present disclosure. For example, while the first fuel charge will typically be via the second spray pattern, and the second fuel charge via only the second spray pattern, the second fuel charge might include simultaneous injection via both the first and second spray patterns. Further, the present disclosure is not limited only to a first and a second, optional injection. Various additional pilot, main and/or post injections might be made in a given engine cycle without departing from the scope of the present disclosure. Further still, while the present disclosure is discussed largely in the context of use of a pressure sensor to determine an appropriate transition point, other embodiments are contemplated. For example, rather than monitoring cylinder pressure to determine an appropriate point at which transitioning to mixed mode is to occur, transitioning could be mapped to other parameters, such as exhaust temperature, turbocharger speed, the power demands on engine 10 or even stress in an engine component. In other words, where the parameter of interest has a predetermined value, electronic controller 30 may determine that the appropriate transition point has been reached, based on a predetermined map of the particular values. Other aspects, features and advantages will be apparent upon an examination of the attached drawing Figures and appended claims.

What is claimed is:

1. A method of operating an internal combustion engine including at least one cylinder with a mixed mode fuel injector disposed at least partially therein, the method comprising the steps of:
injecting a first fuel charge into the at least one cylinder via one of a first spray pattern and a second spray pattern of the mixed mode fuel injector prior to an occurrence of autoignition conditions;
determining a value indicative of at least one of a cylinder pressure and a rate of change in cylinder pressure of the at least one cylinder; and
injecting a second fuel charge into the at least one cylinder via an other of the first spray pattern and the second spray pattern of the mixed mode fuel injector when autoignition conditions are present, upon the occurrence of a predetermined contingency.

2. The method of claim 1 wherein:
the determining step comprises determining the value via a pressure sensor exposed to a fluid pressure of the at least one cylinder and coupled with an electronic controller; and
the step of injecting a second fuel charge comprises injecting the fuel charge, if the determined value exceeds a predetermined threshold.

3. The method of claim 2 wherein:
the step of injecting a first fuel charge comprises injecting the first fuel charge via a first set of injection orifices of the mixed mode fuel injector defining the first spray pattern; and
the step of injecting a second fuel charge comprises injecting the second fuel charge via a second set of injection orifices of the mixed mode fuel injector defining the second spray pattern.

4. The method of claim 3 further comprising the steps of:
igniting the first fuel charge in the at least one cylinder during a given engine cycle; and
igniting the second fuel charge in the at least one cylinder subsequent to igniting the first fuel charge, but during the same engine cycle.

5. The method of claim 4 wherein the step of igniting the first fuel charge comprises compression igniting the first fuel charge.

6. The method of claim 5 wherein:
the step of injecting a first fuel charge comprises injecting said fuel charge at a first average spray angle relative to an axis of the at least one cylinder, before cylinder conditions are at an autoignition point during a given engine cycle; and
the step of injecting a second fuel charge comprises injecting said second fuel charge during the same engine cycle, but after cylinder conditions are at an autoignition point.

7. The method of claim 6 wherein:
the step of injecting a first fuel charge comprises injecting the first fuel charge at least in part by moving a first check of the mixed mode fuel injector; and
the step of injecting a second fuel charge comprises injecting the second fuel charge at least in part by moving a second check of the mixed mode fuel injector that is concentric with the first check.

8. The method of claim 3 further comprising a step of:
determining at least one of, a commanded engine speed and a commanded engine load;
wherein the step of injecting the second fuel charge comprises injecting said charge, based in part on the at least one of, commanded engine speed and commanded engine load.

9. An internal combustion engine comprising:
an engine housing having at least one cylinder configured to compress air to an autoignition condition of a fuel injected into the at least one cylinder;
a mixed mode fuel injector disposed at least partially within said at least one cylinder, and having a first set of outlet orifices associated with a first spray pattern, and a second set of outlet orifices associated with a second spray pattern;
means for determining a value indicative of at least one of a cylinder pressure and a rate of change in cylinder pressure of said at least one cylinder; and
an electronic controller in control communication with said fuel injector and with said means for determining, said electronic controller comprising a computer readable medium having a control algorithm recorded thereon including means for transitioning between first and second injection modes of said mixed mode fuel injector, based upon the occurrence of a predetermined contingency.

10. The internal combustion engine of claim 9 wherein:
said control algorithm is a closed loop control algorithm; and
said means for transitioning includes means for transitioning between first and second injection modes, if the determined value exceeds a predetermined threshold.

11. The internal combustion engine of claim 10 wherein said means for determining includes a pressure sensor exposed to a fluid pressure of the at least one cylinder and coupled with said electronic controller.

12. The internal combustion engine of claim 11 wherein:
said mixed mode fuel injector comprises a first check movable to open or close the first set of outlet orifices, and a second check movable to open or close the second set of outlet orifices; and
said means for transitioning includes means for transitioning from a first injection mode wherein only said first check is opened during a given engine cycle to a second injection mode wherein said second check is also opened during a given engine cycle, if a determined cylinder pressure or rate of change in cylinder pressure exceeds a predetermined cylinder pressure threshold or rate of change in cylinder pressure threshold, respectively.

13. The internal combustion engine of claim 12 wherein:
said first set of injection orifices is disposed at a first average angle relative to an axis of said at least one cylinder; and
said second set of injection orifices is disposed at a second average angle larger than said first average angle relative to said axis.

14. The internal combustion engine of claim 13 wherein said first set of outlet orifices is concentric with said second set of outlet orifices.

15. The internal combustion engine of claim 9 wherein said means for transitioning further comprises means for transitioning based in part on at least one of, a commanded engine speed and a commanded engine load.

16. An article comprising:
a computer readable medium having a control algorithm recorded thereon, said control algorithm including, means for determining a value indicative of a rate of change in cylinder pressure of at least one cylinder of an internal combustion engine, and means for transitioning at least one mixed mode fuel injector of said internal combustion engine between a first fuel injection mode and a second fuel injection mode, based on the occurrence of a predetermined contingency.

17. The article of claim 16 wherein:
said means for transitioning further includes means for transitioning said at least one fuel injector from the first fuel injection mode to the second fuel injection mode, if a determined rate of change in cylinder pressure exceeds a predetermined rate of change in cylinder pressure threshold.

18. The article of claim 17 wherein said control algorithm further includes:
means for determining a value indicative of a crank angle of said internal combustion engine; and
means for commanding a first fuel injection within a crank angle range between about 180 degrees and about 360 degrees, and means for commanding a second fuel injection subsequent to the first fuel injection within a crank angle range between about 340 degrees and about 20 degrees.

19. The article of claim 17 wherein said control algorithm further comprises means for determining at least one of, a commanded engine speed and a commanded engine load, said means for transitioning including means for transitioning said mixed mode fuel injector between the first fuel injection mode and the second fuel injection mode, based in part on said at least one of, commanded engine speed and commanded engine load.

20. The article of claim 19 wherein said control algorithm is a closed loop control algorithm comprising a feedback term based on the determined value indicative of a rate of change in cylinder pressure.

21. A method of operating an internal combustion engine including at least one cylinder with a mixed mode fuel injector disposed at least partially therein, the method comprising the steps of:
injecting a first fuel charge into the at least one cylinder via one of a first spray pattern and a second spray pattern of the mixed mode fuel injector prior to an occurrence of autoignition conditions; and
injecting a second fuel charge into the at least one cylinder via an other of the first spray pattern and the second spray pattern of the mixed mode fuel injector when autoignition conditions are present, upon the occurrence of a predetermined contingency other than engine load.

* * * * *